G. C. BROOM.
FEED-TROUGHS FOR HORSES.
No. 195,205. Patented Sept. 18, 1877.
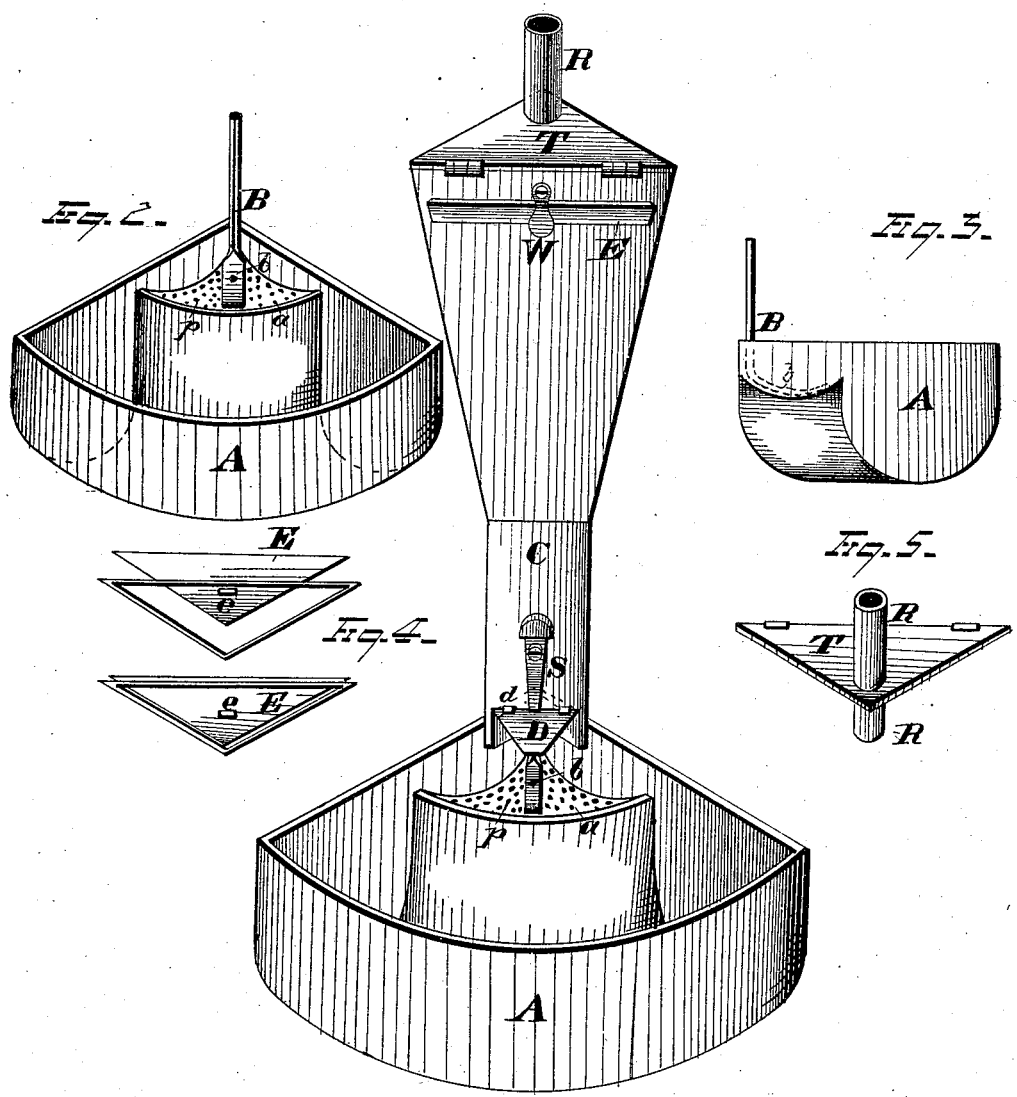

UNITED STATES PATENT OFFICE.

GEORGE C. BROOM, OF CLEVELAND, OHIO.

IMPROVEMENT IN FEED-TROUGHS FOR HORSES.

Specification forming part of Letters Patent No. 195,205, dated September 18, 1877; application filed March 9, 1877.

*To all whom it may concern:*

Be it known that I, GEORGE C. BROOM, of Cleveland, in the county of Cuyahoga and State of Ohio, have invented certain new and useful Improvements in Feed-Troughs for Horses; and I do hereby declare the following to be a full, clear, and exact description of the invention, such as will enable others skilled in the art to which it pertains to make and use it, reference being had to the accompanying drawings, which form part of this specification.

My invention relates to feed-troughs for horses; and consists in the parts and combinations as hereinafter specified and claimed.

In the drawings, Figure 1 represents a perspective view of a device embodying my invention. Fig. 2 represents the trough detached. Fig. 3 shows a side view thereof. Fig. 4 represents the slide in the upper part of the chute as opened and closed. Fig. 5 is a view of the lid of the chute.

The object of my invention is the construction of a trough which shall enable the horse to feed slowly, which shall supply the oats as fast and no faster than the horse feeds—that is, be provided with regulating devices to secure a greater or less flow of the oats—and shall be provided with means whereby the oats are freed from dust and dirt.

A represents the trough, which has formed in it the smaller or auxiliary trough $a$. These troughs may have any form or shape, and may be constructed of any suitable material.

The smaller trough $a$ is elevated above the bottom of the trough A, and is provided with perforations $p$, too small to permit the passage of oats, but sufficiently large to allow the particles of dust and dirt found among the oats to pass through. On the bottom of this perforated trough is pivoted the agitator B, in any effectual manner, at $b$. The perpendicular arm of this agitator extends into the lower part of the hopper or chute C as far as may be required. Said chute may be of any suitable form, and may extend to any required height. Its mouth is provided with a door or lid, D, hinged at $d$, which is kept closed, or nearly so, by a spring, S, which lightly presses on the same.

The upper part of the chute is provided with a slide, E, placed at a short distance from the top or lid of the chute. This is used for the purpose of sustaining a charge of oats, supplied, through the tube or pipe R, from an upper floor, until the same are required to be fed.

When required, the slide E is drawn out a certain distance, limited by the stop $e$, and the oats are then permitted to pass into the lower part of the chute. The oats can, however, be poured directly into the chute by opening the lid T.

In Fig. 4 the slide E is represented in its open and also its closed position.

W is a catch, which keeps slide E in position when not open.

The operation of the device is as follows: The charge of oats is placed in the chute, and the same are discharged therefrom through its mouth at the lower end. They fall on the perforated trough $a$. The horse, while eating the oats out of this trough, moves the agitator about with its nose, which causes the lid D to move slightly, and the oats to be loosened in the chute, whereby the oats are caused to escape into the trough at a more or less uniform rate of speed, which can be so regulated as to correspond with the rapidity with which the horse eats. A large portion of the oats will be shoved into the large trough A by the motion of the horse's nose in feeding, and will be there consumed by the horse. When the large trough has been emptied, the horse will again nose around in the upper perforated trough and agitate the oats, so as to secure a further supply. In this manner the oats are gradually supplied, the horse is compelled to take the oats in small mouthfuls, and a much smaller quantity of oats is therefore wasted by the horse in being thrown around the floor of the stall.

The perforations in the upper trough serve the purpose of clearing the oats of dust, some of which escapes by its own weight, and the greater part is blown out of the oats and through the perforations by the breathing of the horse.

The trough A is especially designed for holding mash or wet feed.

What I claim as my invention, and desire to secure by Letters Patent, is—

1. A feed-trough, A, provided with an extra perforated trough or screen, a, substantially as and for the purpose set forth.

2. In a feed-trough, the combination, with a hopper and chute and feed-trough, of a spring-pressed delivery-valve and an agitator, projecting into the feed-trough, substantially as and for the purpose set forth.

3. In a feed-trough, the combination, with the duplex trough A a, the latter provided with a perforated bottom, p, of the hopper, chute, spring-pressed valve, and agitator; substantially as and for the purpose set forth.

In testimony whereof I have signed my name to this specification in the presence of two subscribing witnesses.

GEORGE C. BROOM.

Witnesses:
 FRANCIS TOUMEY,
 W. E. DONNELLY.